United States Patent Office 2,825,801
Patented Mar. 4, 1958

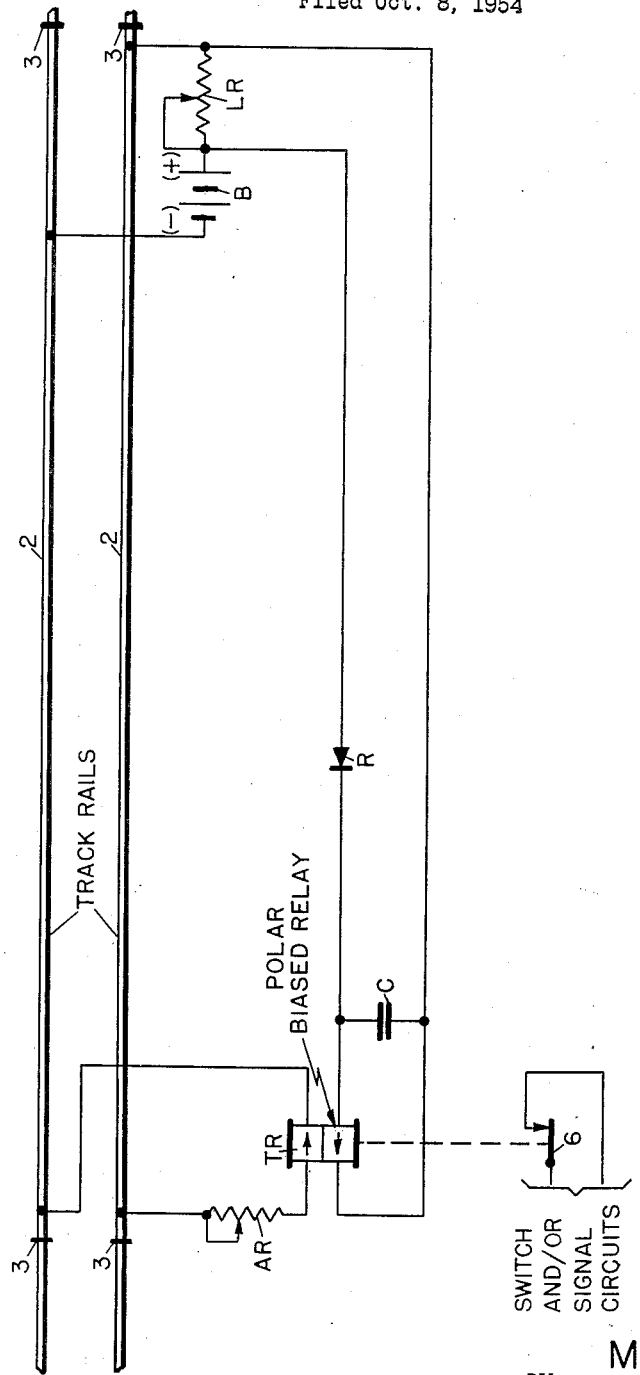

2,825,801

TRACK CIRCUIT RESPONSIVE TO VARYING TRAIN SHUNT

Marcian A. Scheg, Rochester, N. Y., assignor to General Railway Signal Company, Rochester, N. Y.

Application October 8, 1954, Serial No. 461,113

6 Claims. (Cl. 246—41)

This invention relates to direct current track circuits for railroads, and more particularly pertains to means for increasing the sensitivity of such track circuits in response to train-shunts.

Conventional track circuits include a track relay connected across the track rails at one end of a track section with a source of direct current and a series limiting resistor connected across the track rails at the other end of the track section. Normally the track relay is energized; but when a train enters the track section and shunts the rails, the current in the relay is reduced to a low value causing it to drop away. When the train leaves the section, normal energy is again supplied to the relay and it picks up.

In connection with the provision of track circuits for detector track sections, i. e. those including a track switch, it has been found that there are various conditions under which the usual track circuit as above described is inadequate to maintain sensitive response to train presence and may in some cases allow the movement of the track switch under a train. It is proposed in accordance with the present invention to provide a track circuit which is particularly useful in connection with detector track sections where the track relay and track source of current can both be located in the same relay case adjacent the track rails and connected to their respective ends by suitable cable.

Another purpose of the invention is to provide such a track circuit which is responsive to the presence of a variable train shunt. It has been found that a moving train or car will provide a variable shunt even though it may not at all times provide a shunt of sufficiently low value as to actually cause the release of a conventional track relay.

Generally speaking, and without making any attempt to define the exact nature of the invention, it is proposed to provide a track circuit with a track relay of the polar biased type, i. e. a relay which will respond to only one particular polarity. One winding on this relay is connected directly across the track rails; and the other winding on this track relay is connected across the series resistor which is included in series with the track source of direct current connected across the other end of the track section. This winding is so connected that any current through it produces a magnetic flux in the opposite direction to the magnetic flux produced by the current in the main winding connected across the track rails. This opposing flux is thus in a direction which tends to cause the release of the track relay armature.

Since the relay is of the polar biased type, this arrangement is perfectly safe because should the main winding become disconnected or otherwise fail, the current in the auxiliary winding cannot possibly cause the picking up of the track relay armature because it is of a polarity to which the relay cannot respond.

In addition, the auxiliary or second winding is provided with a capacitor and a rectifier arranged so that variations in the voltage drop across the series limiting resistor will result in the storage of energy of a particular polarity in the capacitor which tends to act on the auxiliary winding to release the relay or maintain it released. Thus, the entrance of a train tends to release the track relay while the presence of a train with a variable train shunt tends to maintain it released during the passage of a train or car.

Other objects, purposes and characteristic features of the present invention will in part be obvious from the accompanying drawings and will in part be more specifically described hereinafter.

In describing the invention in detail, reference will be made to the accompanying drawing, which is a diagrammatic view of a track section and associated apparatus constituting one form of a track circuit embodying the present invention.

For the purpose of simplifying the illustration and facilitating in the explanation, the various parts and circuits constituting the embodiment of the invention have been shown diagrammatically and certain conventional illustrations have been employed, the drawing having been made more with the purpose of making it easy to understand the principles and mode of operation, than with the idea of illustrating the specific construction and arrangement of parts that would be employed in practice. Thus, the various relays and their contacts, sources of energy and other devices have been illustrated in a conventional symbolic manner.

With reference to the drawing, a track section having rails 2 is shown as being separated from adjoining sections by suitable insulated joints 3. This track section is assumed to be such as would be associated with the usual track switch either in an interlocking plant or in a classification yard. For such short track sections, all of the associated apparatus is usually located in the same relay case along the trackway; but for the sake of simplicity in the illustration the apparatus has been distributed between the opposite ends of the section.

At the right-hand end of the section a track battery B, a limiting resistor LR and associated leads are connected in series directly across the track rails. This limiting resistor LR is shown as being of the adjustable type so that the potential applied across the track rails can be adjusted to a selected value particularly adapted for the track section with which it is associated.

At the other end of the track section, a track relay TR has its main windings connected across the track rails 2 through an adjustable resistor AR of suitable value. This track relay TR is assumed to be of the polar biased type, and may be of any suitable type relay which will respond to only a particular polarity; but for the sake of definiteness in the disclosure this relay may be of the type such for example as shown in the Patent No. 2,502,811, granted April 4, 1950, to Willing et al.

This track relay TR has an auxiliary winding connected through suitable wires and a rectifier R across the opposite terminals of the limiting resistor LR. In multiple with this auxiliary winding is a suitable capacitor C. The battery B is poled as indicated by the symbols so as to provide current through the track rails and the main winding of the track relay TR in the direction of the arrow associated with the main winding. This current causes the track relay to be normally picked up to close its front contacts one of which contacts 6 has been shown. This contact 6 has been indicated as controlling the switch and/or signal circuits in accordance with the conventional practice, it being understood that one or more contacts may be employed for this purpose. With the track relay normally picked up with a proper adjustment of the limiting resistor LR, the current which flows through the auxiliary winding is at a minimum value; and the resistance of the auxiliary winding and its number of turns is so selected that this current does not prevent the picking up of the track relay in the usual way.

In brief, the resistances of the main and auxiliary windings of the relay TR as well as their number of turns are suitably selected so that when the proper resistance values of LR and AR are obtained, the net flux in the relay TR with the main and auxiliary windings in opposition, is sufficient to cause the armature of the relay TR to be picked up in the usual way. Since various track circuits differ, it is difficult to give typical examples of the values involved. However, it should be noted that the relay windings may have resistance values in the order of the usual track relays, and the limiting resistor LR and adjustable resistor AR may also have values in the usual order. In this connection, it is desirable to have the resistance of the relay end greater than the resistance at the battery end so that the current through the main winding of the relay will be maintained more constant during variable ballast conditions, as more fully explained in connection with my prior application Ser. No. 454,956, filed September 9, 1954. For this reason, the limiting resistor LR may be in the order of two or three ohms but it may be adjusted to have a value as low as one ohm. Assuming that the resistance of the main winding of track relay TR is in the order of four ohms, the adjustable resistor AR may have a resistance in the order of twenty-five ohms. Also, there is the greatest voltage change across resistor LR when a train enters the section if its value is kept low.

Upon the entrance of a train or car into the track section, the usual train shunt effects a reduction in the current flowing through the main winding of the track relay TR and increases the current flowing through the auxiliary winding of the relay TR. This increased current flow through the auxiliary winding is due to the fact that the train shunt across the track rails increases the flow of current from the battery B through the limiting resistor LR. This causes an increase in potential drop across the limiting resistor LR which in turn increases the current flow through the auxiliary winding of the track relay TR. Since the main and auxiliary windings are connected so as to be in opposition, it is readily apparent that the decrease of current in the main winding and the increase of current in the auxiliary winding reduces the net flux in the relay to a relatively low positive value to quickly release the relay. Under some conditions of the track circuit, and under some adjustments of the organization, the net flux will actually be changed to a negative value, which will cause the quick release of the relay armature and actually act as a holding force for maintaining the armature in a dropped away position.

In connection with the build up of current in the auxiliary winding upon the increase of potential across the limiting resistor LR, it should be noted that the inductive characteristics of the relay will tend to slightly delay the build up of current in the relay auxiliary winding; but at the same time the increase of potential is charging the capacitor C. This charging of the capacitor C does not delay the build up of current in the auxiliary winding because the circuit for charging the capacitor is of relatively low resistance since it includes only the forward resistance of the rectifier R and the resistance of the lead connections. This is pointed out to indicate that the capacitor C can be charged relatively quickly regardless of the particular inductive characteristics of the track relay TR. In spite of the inductive characteristics of the track relay TR, the positive application of current to the auxiliary winding tends to reduce the net flux in the relay more rapidly than the flux would normally reduce merely in response to the shunting of the main winding by a train. For this reason, the track relay TR is caused to act very quickly in response to the entrance of a train.

If the train-shunt is the usual effective train-shunt, the track relay remains steadily shunted and the current through the auxiliary winding will be substantially constant so that the track relay will maintain its armature steadily released; and when the train or car leaves the section, the current through the auxiliary winding is reduced to its normal value and the current in the main winding is increased to a normal value so that the normal net flux in the relay returns to a normal value causing the relay armature to be picked up.

It should be noted that the charge on the capacitor C is dissipated through the auxiliary winding, because the rectifier unit R is asymmetric in its characteristics and prevents the capacitor C from readily discharging through the limiting resistor LR. This discharge of the capacitor C through the auxiliary winding of the track relay TR tends to delay the picking up of the track relay following the movement of the train or car out of the track section. If it is desired to reduce this effect, then a variable resistor may be connected across the auxiliary winding and adjusted to the desired value to give the desired time characteristics.

On the other hand, if the train-shunt is variable in value due to rusty rails, or sand on the rails, or the like, then the current flowing through the main winding is variable as well as the current flowing through the limiting resistor LR. The variable voltage across the limiting resistor LR is of course applied to the capacitor C. Since the rectifier unit R prevents discharge of the capacitor through the resistor LR during the low values of the variable potential across the resistor LR, the capacitor tends to maintain a continuous energization of the auxiliary winding. This is assuming that the variations are of such a nature that a peak value of potential occurs before the capacitor is effectively discharged during a low value of the potential. In this way, the capacitor C and rectifier unit R cooperate to cause a more or less continuous hold down effect on the track relay TR by maintaining current flow through the auxiliary winding during the presence of a variable track shunt across the rails.

As above mentioned, a resistor may be connected across the auxiliary winding so as to reduce the hold down effect on the relay when a train leaves the section; but it will be apparent that the presence of such a resistor would reduce the hold down effect during the presence of a variable shunt. Thus, in the event that the picking up of the track relay quickly becomes a factor, it will be appreciated that a compromise must be obtained by the adjustment of the resistor across the auxiliary winding so as to obtain some hold down effect during a variable shunt and yet not permit undue delay in the pick up of the track relay upon the leaving of a train or car.

In some instances, the entrance of a train or car into the section will provide a relatively good train-shunt which would be of a sufficiently low value to cause the release of the armature of the relay TR by acting on the main winding even if no auxiliary winding were used. But, such relatively good train-shunt may in some cases be a recurring train-shunt because of the fast movement of the train. In such a case, the action on the main winding alone might be insufficient to cause the release of the armature, but the momentary increases in potential across the limiting resistor LR will be smoothed by the capacitor C and cause the effective current in the lower auxiliary winding to be of a sufficient value to reduce the net flux in the relay below the drop away value of its armature. In this way, the presence of a variable train-shunt that would not otherwise effect the releasing of a track relay, will act in the organization of the present invention to cause a positive release of the track relay.

In addition, there are other instances where the train-shunt may be of too high a value to cause the release of the track relay by reason of its shunting the main winding alone, but because of the increase in the voltage drop across the limiting resistor LR and the consequent current flow through the auxiliary winding TR, the armature of this track relay TR is released. Also, this relatively poor train-shunt may be of a variable character so that its action on the main winding alone would be wholly insufficient to cause the release of the track relay. However, this continuously varying train-shunt will produce variations in the potential across the resistor LR which will be smoothed by the capacitor C and cause the effective current in the lower auxiliary winding of the track relay to be sufficient to reduce the net flux in the relay below the drop away value of its armature. In this way, the presence of a train in the section is detected in spite of the fact that its train-shunt value across the rails is relatively poor.

Having described a track circuit organization as one specific embodiment of the present invention, it is desired to be understood that this form is selected to facilitate in the disclosure of the invention rather than to limit the number of forms which it may assume; and it is to be further understood that various modifications, adaptations and alterations may be applied to the specific form shown to meet the requirements of practice without in any manner departing from the spirit or scope of the present invention.

What I claim is:

1. In a track circuit organization, a section of track a source of energy and a variable limiting resistor connected across the track rails at one end of said section, a track relay having two windings, one of which is connected across the track rails at the other end of said section, a rectifier unit, and circuit means connecting the other winding of said relay and said rectifier unit in series across said variable limiting resistor.

2. In a track circuit organization, a section of track, a source of energy and a variable limiting resistor connected across the rails at one end of said section, a track relay of the polar biased type having a main and auxiliary winding, said main winding being connected across the rails of said section at its other end with a polarity to cause the response of said relay to said source, a rectifier unit, and circuit means connecting said auxiliary winding and said rectifier unit in series across said variable limiting resistor, said connection and said rectifier unit being so made as to cause current flow through said auxiliary winding in opposition to any current flow through said main winding.

3. In a track circuit organization, a section of track, a source of energy and a limiting resistor connected across the rails at one end of said section, a track relay of the polar biased type having a main and auxiliary winding, said main winding being connected across the rails of said section at its other end with a polarity to cause the response of said relay to said source, a rectifier unit, and circuit means connecting said auxiliary winding and said rectifier unit in series across said limiting resistor, said connection and said rectifier unit being so made as to cause current flow through said auxiliary winding in opposition to any current flow through said main winding, and a capacitor connected across said auxiliary winding.

4. In a track circuit organization for railroads, a section of track, a source of energy and a limiting resistor of relatively low value, circuit means connecting said source and said limiting resistor in series across the rails of said section at one end, a track relay of the polar biased type having a main and an auxiliary winding, an adjustable resistor of relatively high value as compared to the value of said limiting resistor, circuit means connecting said adjustable resistor and said main winding of said track relay across the rails of said section at the other end with a polarity to cause the response of said relay to said source of energy, a rectifier unit, a capacitor, and circuit means connecting said capacitor and said auxiliary winding in multiple across said limiting resistor and including said rectifier unit in series in such connection with the polarity of said connections permitting current flow due to a potential across said limiting resistor in a direction through said auxiliary winding to produce a magnetic flux in opposition to the magnetic flux of said main winding but normally of a lesser value, whereby said track relay TR is normally actuated by the potential across said track rails but is caused to drop away upon the entrance of a train having a steady train-shunt or a variable one.

5. In a track circuit organization for railroads, a section of track having its rails insulated from adjoining sections, a source of energy, a limiting resistor, circuit means connecting said source and said limiting resistor in series across the rails at one end of said section, a track relay having a main winding and an auxiliary winding, said two windings being differentially arranged, circuit means connecting said main winding across the track rails at the other end of said section, circuit means including a rectifier for connecting said auxiliary winding across said limiting resistor to permit current flow through said auxiliary winding in a direction to produce magnetic flux in opposition to the magnetic flux produced by current in said main winding from said source, and a capacitor connected in multiple with said auxiliary winding.

6. In a track circuit organization for railroads, a section of track having its rails insulated from adjoining sections, a source of energy, a limiting resistor, circuit means connecting said source and said limiting resistor in series across the rails at one end of said sections, a track relay of the polar biased type having a main winding and an auxiliary winding, a compensating resistor, circuit means connecting said main winding and said compensating resistor in series across the rails of said section at the other end, an asymmetric unit, circuit means connecting said auxiliary winding in series with said asymmetric unit across said limiting resistor, said asymmetric unit being connected in a manner to allow current to flow through said auxiliary winding by reason of the potential drop across said limiting resistor, said auxiliary winding being connected differentially with respect to said main winding, and a capacitor connected in multiple across said auxiliary winding.

References Cited in the file of this patent

UNITED STATES PATENTS

| 1,812,208 | Lazich | June 30, 1931 |
| 2,206,578 | Place | July 2, 1940 |